(12) United States Patent
Brueckner et al.

(10) Patent No.: US 7,656,865 B2
(45) Date of Patent: Feb. 2, 2010

(54) METHOD FOR TRANSMISSION OF DATA TELEGRAMS IN A SWITCHED CYCLICAL COMMUNICATION SYSTEM

(75) Inventors: Dieter Brueckner, Unterleiterbach (DE); Dieter Klotz, Fuerth (DE); Karl-Heinz Krause, Nuremberg (DE); Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 744 days.

(21) Appl. No.: 11/083,943

(22) Filed: Mar. 21, 2005

(65) Prior Publication Data

US 2006/0018327 A1    Jan. 26, 2006

Related U.S. Application Data

(63) Continuation of application No. PCT/DE03/02980, filed on Sep. 8, 2003.

(30) Foreign Application Priority Data

Sep. 20, 2002    (DE) ................................. 102 43 850

(51) Int. Cl.
*H04L 12/66* (2006.01)
(52) U.S. Cl. ....................... 370/353; 370/400; 370/450; 370/468
(58) Field of Classification Search ................. 370/299, 370/353, 400, 450, 468
See application file for complete search history.

(56) References Cited

U.S. PATENT DOCUMENTS

| | | | | |
|---|---|---|---|---|
| 5,570,355 A | * | 10/1996 | Dail et al. | 370/352 |
| 5,757,784 A | * | 5/1998 | Liebowitz et al. | 370/321 |
| 6,356,559 B1 | * | 3/2002 | Doucette et al. | 370/450 |
| 6,483,846 B1 | * | 11/2002 | Huang et al. | 370/445 |
| 7,031,308 B2 | * | 4/2006 | Garcia-Luna-Aceves et al. | 370/390 |
| 2001/0002195 A1 | * | 5/2001 | Fellman et al. | 370/420 |
| 2002/0083245 A1 | * | 6/2002 | Van De Meulenhof et al. | 710/107 |
| 2003/0069988 A1 | * | 4/2003 | Rune et al. | 709/237 |
| 2003/0169772 A1 | * | 9/2003 | Bardini et al. | 370/503 |

FOREIGN PATENT DOCUMENTS

| | | |
|---|---|---|
| DE | 100 58 524 A1 | 6/2002 |
| EP | 1 128 612 A2 | 8/2001 |
| WO | WO 02/43336 A1 | 5/2002 |

* cited by examiner

*Primary Examiner*—Kevin C Harper
*Assistant Examiner*—Sai-Ming Chan
(74) *Attorney, Agent, or Firm*—Staas & Halsey LLP

(57) ABSTRACT

A method for the transmission of data messages in a switched cyclical communication system (38, 39) with a linear or ring arrangement of the users. Real-time critical data messages are transmitted in a first segment (20) of a transmission cycle (31), without the need to first plan the send and receive instants in the forwarding users, such that the chronological start (21) of the first segment (20) of a transmission cycle (31) is guaranteed by all users in all transmission cycles through monitoring. The duration of the first segment (20) of a transmission cycle (31) can be fixedly specified or automatically adjusted using a timeout procedure.

36 Claims, 3 Drawing Sheets

20. First Segment of Transmission Cycle
21. Start of First Segment
22. End of First Segment
23, 24, 25. Real-Time Critical Data Messages
27, 28, 29, 30. Timeout Periods
31. Transmission Cycle
32. Start of Transmission Cycle
33. End of Transmission Cycle
34, 35. Additional Segments of Transmission Cycle
26, 36, 37. Non-Real-Time Critical Data Messages

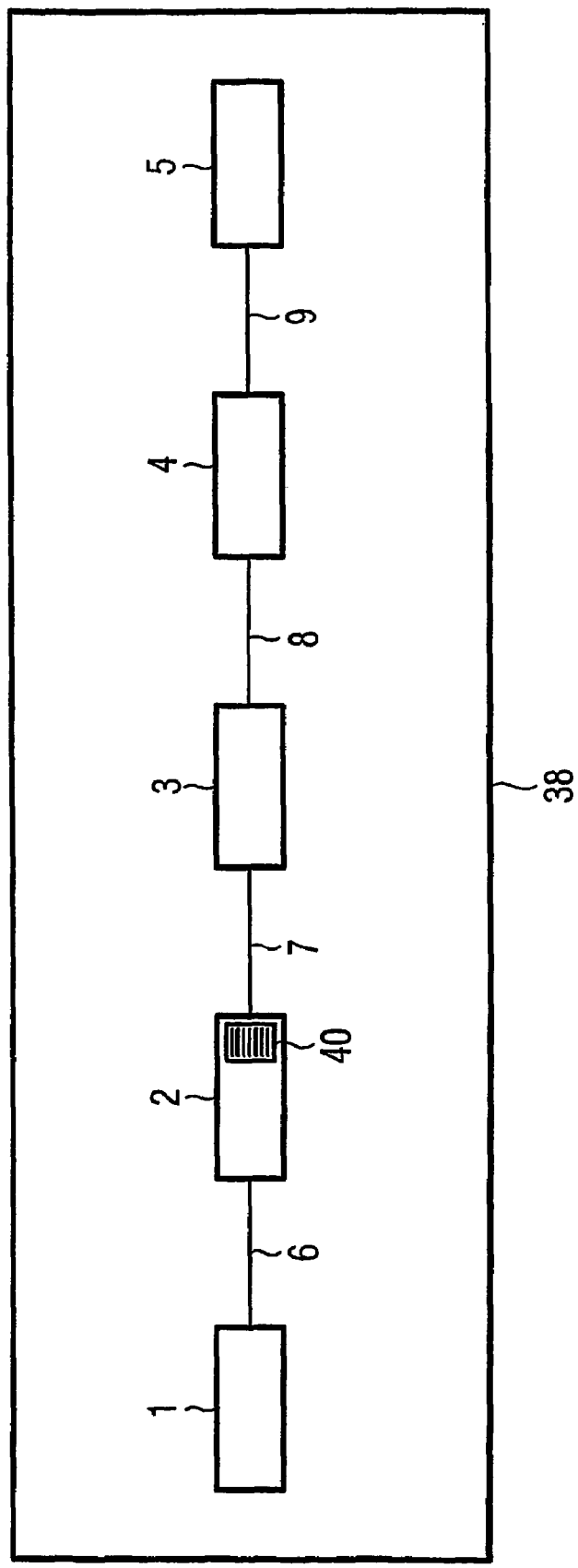

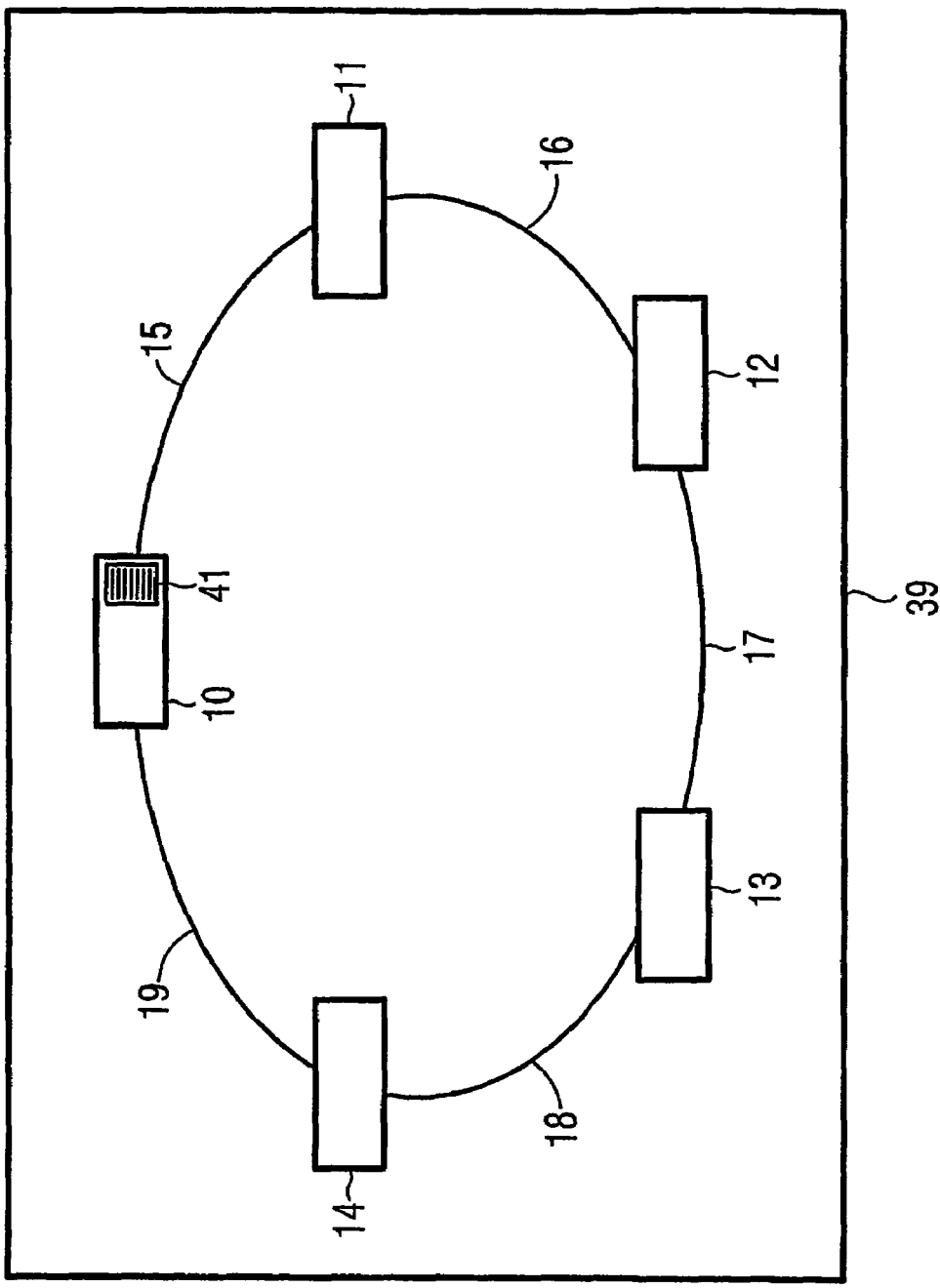

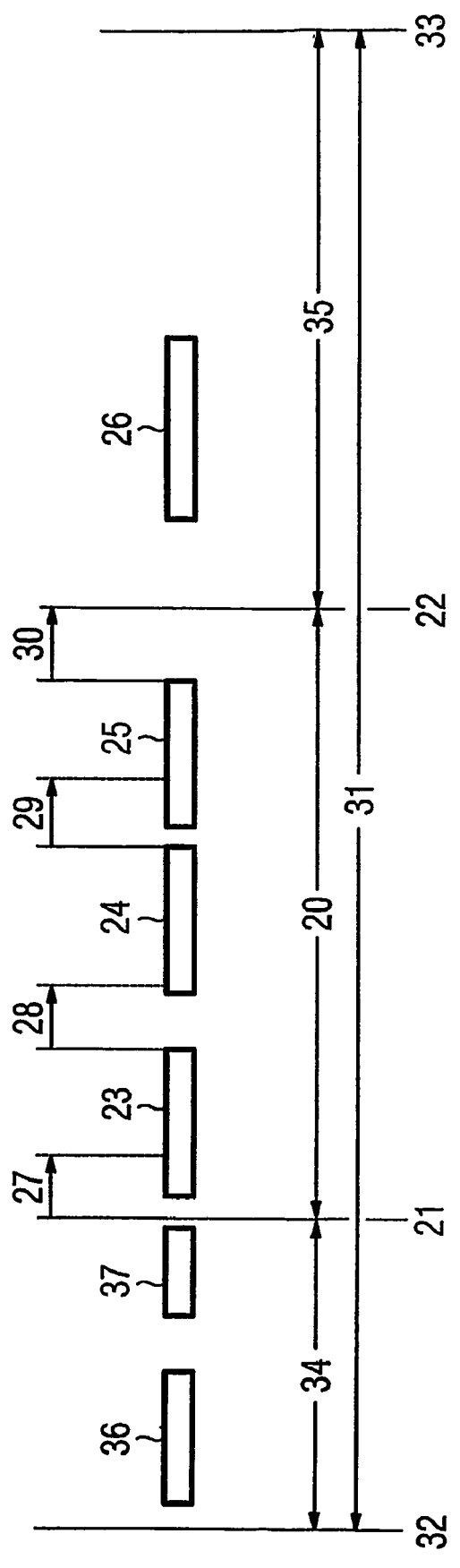

METHOD FOR TRANSMISSION OF DATA TELEGRAMS IN A SWITCHED CYCLICAL COMMUNICATION SYSTEM

This is a Continuation of International Application PCT/DE2003/002980, with an international filing date of Sep. 8, 2003, which was published under PCT Article 21(2) in German, and the disclosure of which is incorporated into this application by reference.

FIELD OF AND BACKGROUND OF THE INVENTION

1. Field of the Invention

The present invention relates to a method for transmitting data messages in a switched cyclical communication system. The present invention further relates to a switched cyclical communication system transmitting data messages and to a user of such a communication system.

2. Description of Related Art

A communication system is a system with a plurality of users, which are interconnected by network connections for the mutual exchange of data or the mutual transmission of data. The data to be transmitted are dispatched as data messages. The data may be combined into one or more packets, and in this combined form are sent over the network connections to the respective receiver. Hence, this combined form of data is sometimes termed "data packets." The term "transmission of data" as used hereinafter is synonymous with the above-described transmission of data messages or data packets.

Users of a communication system are, for example, central automation devices, programming, configuration and operator units, peripheral devices such as, for example, input/output modules, drives, actuators, sensors, stored program controllers (SPCs) or other control units, computers or machines that exchange electronic data with other machines and, in particular, process data of other machines. Users are also referred to as network nodes or nodes.

The term "control units", as used hereinafter, refers not only to open and closed-loop control units of all types but also to, for example, coupling nodes (switches) and/or switch controllers. For example, switched Ethernets, industrial Ethernets and particularly, isochronous Real-Time Ethernets are used as communication systems or data networks.

Communication systems with transfer rates $\geq 100$ MB/s are usually switched high-performance data networks and are made up of individual point-to-point connections with so-called active nodes or coupling nodes, also referred to as switches, which are switched between the separate users. As a rule, each coupling node has a plurality of ports. Each coupling node can be connected to a number of users depending on the number of ports. Switches are usually separate devices but can themselves be users. These switches are increasingly integrated into the connected devices or users.

In distributed automation systems, for example, in the field of drive technology, specific data must arrive at specific times in the users for which they are intended and must be processed by the recipients. Hence, one also speaks of real-time critical data or data traffic because the failure of the data to arrive at the destination on time leads to undesirable results in the user.

In distributed automation systems where specific data must arrive at specific times, a parallel use of Internet communication technology in the hardware and software and a connection to the Internet or Intranet would be highly desirable. Internet communication is spontaneous communication, however. That is, in the Internet or Intranet communication, the time and the data volume of a data transfer cannot be predicted. Thus, the potential collision/wait situations in the communication lines (in the case of shared medium data networks) or in the switches (in the case of switched data networks) lead to non-deterministic behavior.

Unpredictable delays in the switches have two causes:

An ongoing data transfer cannot be interrupted. Thus, in each switch, a real-time critical data message may meet a currently ongoing transfer of a data message of maximum length. Although the worst-case delay of an ongoing data transfer can be calculated, the resulting time is unacceptable in a data network with a large number of switches connected in series.

In overload situations a switch temporarily stops accepting data messages if memory is tight. Data messages may even be discarded. In the event of an overload, worst-case predictions are no longer possible.

Thus, it is not possible to guarantee the chronologically very precise communication required for many automation tasks with these spontaneous communication systems. In particular, it is not possible to mix a real-time communication with other, spontaneous Internet communication.

To transfer real-time critical data, the related-art methods require scheduling. Scheduling makes it possible to prevent wait situations. In switched networks, scheduling is sufficient provided all of the switches involved in the communication enforce this scheduling scheme. This scheduling scheme allows any type of end users to be connected to each other. The related-art system and method for transmitting data through switchable data networks, particularly the Ethernet, is known as isochronous real-time or IRT communication, which allows a mixed operation of real-time critical and non-real-time critical, particularly Internet or Intranet-based data communication.

For example, see German Application DE 100 58 524.8, which is incorporated herein by reference. The system and method disclosed in this Application enables both real-time critical (RT) and non-real time critical (NRT) communication through cyclical operation in a switchable data network consisting of users and coupling units such as a distributed automation system.

The real-time critical communication is planned in advance, such that the send or forwarding instants for all real-time critical data messages to be transmitted are known before the start of data transmission. In other words, the duration of the segment for transmitting non-real-time critical data is defined automatically by the duration of the segment for transmitting real-time critical data.

The duration of a transmission cycle is variable but is determined at least once before data transmission, for example, by a control computer, and its length is the same for all users and coupling units of the switchable data network.

OBJECTS OF THE INVENTION

Objects of the present invention include providing an improved method, an improved communication system, and a user of the improved communication system, which allows deterministic data communication without the need to store the planning data of the deterministic communication traffic in all the forwarding switches involved in the communication.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an exemplary, non-limiting formulation of the present invention, a method for transmitting data messages in a switched cyclical communication system with a plurality of users interconnected by network connections is provided. Each user is configured as a sender and/or receiver of data messages and each user has at least one buffer memory for storing data messages. The data messages are transmitted in transmission cycles. Each transmission cycle has at least one first segment for transmitting data messages with real-time critical data and at least one additional segment for transmitting data messages with non-real-time critical data.

The method includes identifying the data messages which contain the real-time critical data, determining the chronological start of the first segment of a transmission cycle within the transmission cycle, ensuring that the transmission of a non-real-time critical data message is completed prior to the start of the first segment of the transmission cycle, and transmitting the real-time critical data messages in the first segment of the transmission cycle.

According to yet another exemplary, non-limiting formulation of the present invention, a user for a communication system is provided. A user in a switched cyclical communication system has at least one section that has no branchings and/or no junctions, where the user is configured as at least one of a sender and a receiver of data messages. The user has at least one buffer memory storing data messages that are transmitted in transmission cycles. Each transmission cycle has at least one first segment transmitting data messages with real-time critical data and at least one additional segment transmitting data messages with non-real-time critical data.

The user includes a module identifying the data messages containing real-time critical data, a module determining a chronological start of a first segment of a transmission cycle within the transmission cycle, and a module ensuring that the transmission of a non-real-time critical data message is completed prior to the start of the first segment of the transmission cycle. In addition, the user includes a module transmitting the real-time critical data messages in the first segment of the transmission cycle.

According to yet another illustrative, non-limiting formulation of the present invention, a communication system having a number of users, is provided. Each user of this system has features of the user described above.

Preferably, the communication system is composed of one or more sections, such that at least one section has no branchings and/or no junctions. The method according to the exemplary, non-limiting formulation of the present invention is particularly efficient for a communication system of this type; that is, a communication system that consists only of sections with no branchings and/or no junctions, i.e., for simple topologies, for example, linear topologies or ring topologies.

According to a preferred variation of the illustrative formulation of the present invention, data messages that contain real-time critical data are identified by a unique header identifier. This introduces a special message type, which can be detected by the hardware, for example, such that data messages containing non-real-time critical data can be distinguished from the data messages containing real-time critical data.

According to yet another refinement of the illustrative formulation of the present invention, a non-real-time critical data message, which is queued for transmission in a user prior to the chronological start of the first segment of the transmission cycle, is not transmitted but rather buffered in the buffer memory of the respective user if the transmission of the data message to be sent is not completed by the chronological start of the first segment of the transmission cycle. Consequently, this non-real-time critical data is sent only after the end of the first segment of the transmission cycle.

The first segment of a transmission cycle, is reserved for transmitting real-time critical data messages and does not necessarily start, for example, directly at the beginning of a transmission cycle. For the first segment of the transmission cycle, this ensures that the first segment starts at a fixed predefined instant and that this start is actually guaranteed.

The respective user monitors the start of the first segment by ensuring that the data transfer of a preceding non-real time critical data message queued for transmission does not extend into the time phase of the first segment. If the non-real time critical data message extends into the first segment, the transmission process of the respective non-real-time critical data message is not started. Instead the respective data message is buffered in the buffer memory of the respective user and transmitted only after the transmission of the real-time critical data has been completed, i.e., after the end of the first segment. Thus, it is ensured that within the time phase of the first segment of a transmission cycle, only real-time critical data messages having the highest priority for transmission or forwarding are transmitted, and therefore permitted to ignore flow control mechanisms.

According to yet another refinement of the exemplary formulation of the present invention, the time length of the first segment of the transmission cycle can be fixedly set. This minimizes the respective time segment which is required to send real-time critical data messages and which is known in advance in this case, such that no unnecessary wait times occur during which no data message can be sent.

According to a further preferred variation of the illustrative variation of the present invention, the time length of the first segment of the transmission cycle can be automatically adjusted using a time-out procedure. With the chronological start of the first segment of the transmission cycle, or immediately after the end of the transmission of a real-time critical data message within the first segment of a transmission cycle, a timeout period starts to run, such that the first segment of the transmission cycle is terminated with the elapse of the timeout period. That is, if no transmission start of a real-time critical data message falls within this timeout period, then the first segment has ended. The transmission segment is not terminated if the transmission start of a real-time critical data message falls within the timeout period.

This timeout procedure ensures that all real-time critical data that are queued for transmission are actually transmitted within the current transmission cycle. At the same time, only the time period within a transmission cycle necessary to transmit the real-time critical data message is used. If, for example, no real-time critical data message is to be sent within a current transmission cycle, the first segment of the respective transmission cycle is terminated immediately at the end of the timeout period. On the other hand, the first segment of the respectively current transmission cycle is extended with the transmission of a real-time critical data message if the start of this transmission process falls within, that is to say before the elapse of, the timeout period.

Once the transmission of the real-time critical data message is completed, the timeout period is restarted. If another real-time critical data message is started prior to the elapse of the timeout period, the first segment of the respectively current transmission cycle is extended until the transmission process has been completed. Thereafter, another timeout period starts to run. This process is continued until a timeout period elapses without a further transmission start of a real-time critical data message falling within this timeout period.

With the end of the elapsed timeout period, the first segment of the respective current transmission cycle is terminated. The additional segment of the respectively current transmission cycle that is still available until the end of the transmission cycle can be used for the transmission of non-real-time critical data messages, particularly, spontaneous Internet or Intranet data traffic.

Preferably, the duration of the timeout period can be set. This makes it possible to adjust the required period as needed.

According to yet another variation of illustrative formulation of the present invention, free memory space is reserved for buffering the real-time critical data messages in the buffer memory of the respective user. The maximum size of the free memory space to be reserved corresponds to the amount of the data or the data messages to be injected at the respective user. To control the reservation of the free memory space in the buffer memory of the respective user, a marking is set. This marking corresponds to the maximum size of the free memory space to be reserved. Furthermore, if less than the free memory space identified by the marking and to be reserved in the buffer memory of the respective user, is available, the respective user accepts real-time critical data messages and/or control diagrams but rejects and/or discards non-real-time critical data messages.

The maximum free memory space required for possible buffering of real-time critical data messages is always available. In other words, it is guaranteed that no real-time critical data message is lost, for example, because of memory space problems, which would lead to a significant fault in the respective communication system, particularly, the distributed automation system.

In simple topologies, that is, in communication systems without branchings and/or junctions, such as linear or ring arrangements of the users of a communication system, this maximum required free memory space can be readily calculated locally. Provided that the data transfer rates are the same on the respective network connection paths between the individual users, this maximum required free memory space corresponds to the amount of data or data messages injected locally by the respective users.

The underlying worst-case assumption is that all locally injected data or data messages are transmitted first, before data or data messages to be forwarded are transmitted. This memory space must accordingly be reserved in advance. For this purpose, a marking—the low water mark provided for flow control—is set. This so-called low water mark is a measure of the free memory space still available in the buffer memory of the respective user. If the buffer memory space falls below this limit, the respective user accepts, and optionally stores and forwards only real-time critical data messages. In addition, data messages used for flow control are still accepted, while all other data messages, particularly, non-real-time critical data messages, are rejected and/or discarded.

In more complex topologies it is necessary to reserve a larger amount of maximum free memory space required for buffering the incoming data messages, particularly, in network nodes with junctions, because congestion may occur at such junctions.

If the respective injection instants of all real-time critical data messages are planned in advance in the users of the communication network, the memory space requirement in the respective buffer memory of the respective users can be reduced to a constant minimum value, which depends on the implementation. Thus, the length of the reserved time phase of each current transmission cycle within which all the real-time critical data messages are guaranteed to be transmitted results from the volume of the real-time critical data to be transmitted over a connecting link between two users plus the transmission time necessary to establish this connection path.

It is furthermore particularly advantageous that the disclosed methods are applicable in automation systems, particularly in packing machines, presses, plastic injection molding machines, textile machines, printing machines, machine tools, robots, handling systems, wood processing machines, glass processing machines, ceramic processing machines and lifting devices.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements, in which:

FIG. 1 is a block diagram of a linear communication system according to an exemplary, non-limiting embodiment of the present invention, FIG. 2 is a block diagram of a ring communication system according to an exemplary, non-limiting embodiment of the present invention, and FIG. 3 is a block diagram illustrating a transmission cycle and the principle of automatically determining a reserved time phase according to an exemplary, non-limiting embodiment of the present invention.

DETAILED DESCRIPTION OF ILLUSTRATIVE, NON-LIMITING EMBODIMENTS

FIG. 1 shows a block diagram of a linear communication system 38 according to an illustrative, non-limiting embodiment of the invention. The depicted communication system 38 represents, for example, a distributed real-time critical automation system. The communication system 38 is furthermore a switched communication network, for example, a Real-Time Ethernet. This communication system 38 is a cyclically operating system. In other words, in the communication system 38, data are transmitted in one or more transmission cycles or communication cycles.

The depicted (in FIG. 1) communication system 38 has a plurality of users 1, 2, 3, 4, and 5 that are configured as both senders and receivers of data messages. The users, 1, 2, 3, 4 and 5 can be, for example, computers, other automation devices, such as drives, or separate coupling units, i.e., switches, or even preferably, Real-Time Ethernet switches. Each of the users 1, 2, 3, 4 and 5 of the communication system 38, however, can also have a coupling unit integrated into that user, particularly a Real-Time Ethernet switch. For reasons of clarity, the integrated switches are not depicted in FIG. 1. The switches are used to inject and/or receive and/or forward the data messages that are to be transmitted, and particularly, the real-time critical data messages that are to be transmitted. The users 1, 2, 3, 4, 5 are also referred to as network nodes.

Each of the users 1, 2, 3, 4, 5 has at least one buffer memory. For reasons of clarity, in FIG. 1, only one buffer memory 40 of the user 2 is depicted and identified. The users 1, 2, 3, 4, 5 of the communication system 38 are disposed in a linear arrangement and are interconnected by the network connections 6, 7, 8 and 9.

To distinguish the data messages that contain real-time critical data from the data messages that contain non-real-time critical data, the real-time critical data messages are provided with a unique header identifier, for example. These unique headers may be created or generated as the respective message is injected by a user, for instance, user 1. Identifying the real-time critical data, allows each user or switch to distinguish incoming data messages based on their content and to handle these received messages accordingly when they are forwarded.

In a cyclical communication system where data are transmitted in one or more transmission cycles, distinguishing between the real-time critical data and non-real-time critical data is necessary, as mentioned above. According to this illustrative embodiment of the present invention, each of the communication or transmission cycles has at least one first segment within the transmission cycle. This first segment of the transmission cycle is reserved exclusively for transmitting real-time critical data messages. Chronologically, this segment is, for example, located within the respective transmission cycle such that, before the start and after the end of the first segment, additional transmission segments are available within the respective transmission cycle. These additional transmission segments are reserved exclusively for non-time-critical communication such as spontaneous Internet data traffic. A more detailed explanation of these transmission segments is provided below in the description of FIG. 3.

In the communication system 38, the user 1 is, for example, a control computer that sends real-time critical data to the user 5, which can be any type of automation device, particularly a drive. The user 5 receives not only real-time critical data from the user 1 but also real-time critical data from the users 2, 3 and 4, such as real-time critical peripheral images.

In a real-time communication system, the injection points in the respective users of all real-time critical data messages are usually planned or known in advance, e.g., German Application DE 100 58 524.8, incorporated herein by reference. However, the exemplary present linear topology of the communication system 38 depicted in FIG. 1, and/or the ring topology of the communication system 39 depicted in FIG. 2, do not require the planning in advance of the receive instants or the forwarding instants of the injected data messages in the forwarding users, for example, users 2, 3, and 4. Consequently, the IRT communication method of the illustrative embodiment of the present invention does not require the planning of the receive instants or the forwarding instants of the injected data messages in the forwarding users, for example, users 2, 3 and 4.

Irrespective thereof, it is nevertheless necessary, however, to ensure that, on the one hand, no real-time critical data message is lost and, on the other hand, each real-time critical data message actually reaches the correct receiver at the correct instant. The injecting or the forwarding of real-time critical data messages from the users 1, 2, 3, 4 to the user 5, for example, may cause wait situations in each of the forwarding users 2, 3, 4. According to the illustrative embodiment of the present invention, to accommodate these possible wait situations, each user 1, 2, 3, 4, 5, is provided with at least one buffer memory. For the sake of clarity, only one buffer memory is depicted in FIG. 1. That is, FIG. 1 shows user 2 having a buffer memory 40. The buffering of data messages in the buffer memories ensures that real-time critical data messages are not lost.

Each of the buffer memories, e.g., the buffer memory 40 of the user 2, as depicted in FIG. 1, requires a maximum free memory space in which all real-time critical data messages queued for forwarding can actually be buffered. In simple topologies, such as the linear arrangement of the users 1, 2, 3, 4, 5 of the communication system 38, this maximum required memory space can readily be calculated locally. Assuming that the data transfer rates are identical on each of the network links, for example, the network link 6 between the users 1 and 2, the network link 7 between the users 2 and 3, the network link 8 between the users 3 and 4 and the network link 9 between the users 4 and 5, this maximum required free memory space corresponds to the respective amount of data or data messages injected locally by the respective users. This calculation of the maximum required memory space is based on the worst-case assumption that all the locally injected data or data messages are transmitted first before the data messages queued for forwarding may be forwarded. This memory space must thus be reserved in advance in each of the users.

To reserve the memory space in advance, a marking is set in the buffer memory of each user, e.g., in the buffer memory 40 of the user 2. This marking corresponds to the existing low water mark required for the flow control. This so-called low water mark is a measure of the free memory space still available in the buffer memory of the respective user, e.g., the buffer memory 40 of the user 2.

The respective user, e.g., user 2, accepts the incoming data message and forwards it according to its destination, or the respective user buffers the incoming message in the respective buffer memory before forwarding. If the available memory is below the low water mark, however, only real-time critical data messages are buffered in the buffer memory of the respective user. The only exception to this rule is data messages used for flow control. These data messages are likewise still accepted. All other data messages, on the other hand, particularly non-real-time critical data messages generated, for example, in spontaneous Internet traffic, are rejected or discarded.

Because the set marking, i.e., the low water mark, corresponds in each user to the maximum size of the free memory space to be reserved, the maximum free memory space required for an optional buffering of real-time critical data messages is always available. In other words, it is guaranteed that no real-time critical data message is lost due to memory space problems, which would otherwise lead to a significant fault in the communication system 38.

FIG. 2 shows a block diagram of a ring communication system 39 according to another exemplary embodiment of the present invention. The communication system 39 consists of the users 10, 11, 12, 13, 14. These users 10, 11, 12, 13, and 14 are interconnected by network links 15, 16, 17, 18, and 19. In particular, the network link 15 connects the user 10 with the user 11, the network link 16 connects the user 11 with the user 12, the network link 17 connects the user 12 with the user 13, the network link 18 connects the user 13 with the user 14, and the network link 19 connects the user 14 with the user 10, thereby forming a closed ring. In this ring structure of the communication system 39, just like in the liner communication system 38 depicted in FIG. 1, each user 10, 11, 12, 13, and 14, has at least one buffer memory. For the sake of clarity only the buffer memory 41 of the user 10 is depicted in FIG. 2.

In the example depicted in FIG. 2, the user 10 transmits real-time critical data to the user 13. The user 10 may, for example, be a control computer, whereas the user 13 may be, for example, an automation device, particularly a drive. The rest of the users 11, 12, and 14 also send real-time critical data, e.g., real-time critical peripheral images, to the user 13. Thus, the descriptions with reference to the linear communication system 38 depicted in FIG. 1 also apply to the ring arrangement of the users of the communication system 39.

FIG. 3 shows a block diagram illustrating the transmission cycle 31 and the principle of automatically determining the reserved time phase, i.e., the first segment 20, using a timeout procedure.

In FIG. 3, the communication cycle or transmission cycle 31 is divided into three segments, for example. The first segment 20 is designated for the transmission of real-time critical data messages and the additional segments 34 and 35 for the transmission of non-real-time critical data messages. The additional segment 34 comes chronologically before the first segment 20, while the additional segment 35 comes after the first segment 20.

The first segment 20 of the transmission cycle 31, which is designated for the transmission of data messages containing real-time critical data, is delimited by a chronological start 21 and an end 22. In the example shown in FIG. 3, the transmission cycle 31 is delimited by the chronological start 32 and the end 33. The depicted transmission cycle 31 is chronologically divided such that an additional segment 34 for the transmission of non-real-time critical data messages, e.g., spontaneous Internet traffic, begins with the chronological start 32 of the transmission cycle 31. The additional segment 34 of the transmission cycle 31 is followed by the first segment 20 with the chronological start 21, which is reserved for the transmission of real-time critical data messages. The end 22 of the first segment 20 is in turn followed by the additional segment 35 in which non-real-time critical data messages, e.g., spontaneous Internet traffic, can again be transmitted.

According to the illustrative embodiment of the present invention, the chronological start 21 of the first segment 20 of a transmission cycle 31 is determined at least once, preferably at the beginning, for example, before the start of the first transmission cycle. Each user of the communication system guarantees that in each additional transmission cycle, this chronological start 21 occurs at the same instant within each current transmission cycle. This means that the reserved time phase, i.e., the first segment 20 of a transmission cycle 31 as depicted in FIG. 3, occurs at the same instance in each transmission cycle in each user.

At the same time, each user ensures that the transmission of non-real-time critical data messages 36 and 37, which are to be transmitted in the transmission cycle 31 in the additional segment 34 prior to the first segment 20, is fully completed before the chronological start 21 of the first segment 20 of the transmission cycle 31. The respective user thus checks whether the transmission of the non-real-time critical data message 37, for example, can be fully completed before the chronological start 21 is reached. The respective user can readily calculate whether the non-real-time critical data message can by fully transmitted before the chronological start because the size of the respective data message 37 and the transmission rate of the respective user are known. If the transmission process can actually be completed before the chronological start 21, the non-real-time critical data message 37 is still transmitted. If not, the transmission process of the data message 37 is not started and this data message, e.g., non-real-time critical data message 37, is instead buffered in a buffer memory of the respective user and is forwarded to the respective receiver only after the end 22 of the first segment 20. This data message, e.g., non-real-time critical data message 37 is buffered in a buffer memory of the respective user only if sufficient free memory space is available. Otherwise, the data message 37 would be rejected and/or discarded.

The chronological start 21 of the first segment 20 can thus always start at a fixedly predetermined instant. Since the user monitors the data transfer of a preceding non-real-time critical data message 37 that is to be transmitted to ensure that it does not extend into the time phase of the first segment 20, this chronological start 21 of the first segment 20 can actually be guaranteed. If the end 22 of the first segment 20 is reached, other non-real-time critical data messages 26 can be transmitted within the additional segment 35 until the end 33 of the transmission cycle 31.

The time length of the first segment 20 can be fixedly set, but is preferably also automatically adjustable using a timeout procedure, for example. For instance, with the chronological start 21 of the first segment 20 of the transmission cycle 31, a timeout period 27, depicted in FIG. 3, starts to run. This timeout period may be implemented by a timer in the respective user or by some other software or hardware solution that is suitably coupled to the time characteristics of the transmission cycle. The duration of such a timeout period 27 can be parameterized and set.

If, for example as depicted in FIG. 3, a real-time critical data message 23 is queued for transmission within the timeout period 27, then this real-time critical data message 23 is transmitted, and at the end of the transmission process another timeout period 28 starts to run. The timeout period 28 preferably has the same time length as the timeout period 27. If another real-time critical data message 24 is queued for transmission before the elapse of the timeout period 28, then this data message is transmitted. The duration of the first segment 20 is thereby further extended.

After the transmission process of the data message 24 has been completed, a timeout period 29 begins to run again, which, preferably, also has the same time length as the timeout periods 27 and 28, respectively. If prior to the elapse of the timeout period 29 another real-time critical data message 25 is queued for transmission, this data message 25 is likewise transmitted and the first segment 20 of the transmission cycle 31, i.e., the segment reserved for the transmission of real-time critical data messages, is further extended. After the transmission process of the real-time critical data message 25 has been completed, a timeout period 30 begins to run again, which has the same time length as each of the timeout periods 27, 28 and 29. If, for example, no further real-time critical data message is queued for transmission by the elapse of the timeout period 30, the first segment 20 is terminated with the end of the timeout period 30, such that the end 22 of the first segment 20 coincides with the end of the timeout period 30.

The time length of the first segment 20 can thus be automatically adjusted. If other real-time critical data messages were queued for forwarding and/or transmission, the first segment would be extended further, and if necessary, until the end 33 of the transmission cycle 31 is reached. If the first segment 20 is extended until the end 33 of the transmission cycle 31, no additional segment 35 is provided. Consequently, no further non-real-time critical data messages could be transmitted. On the other hand, if no real-time critical data messages, e.g., the real-time critical data message 23, were queued for transmission within the timeout period 27, the first segment 20 of the transmission cycle 31 would be terminated immediately. In other words, the first segment 20 would terminate with the end of the timeout period 27. Consequently, the additional segment 35 for the transmission of non-real-time critical data messages would be extended.

Accordingly, in the illustrative embodiment of the present invention, the send and receive instants of the real-time critical data messages being forwarded, e.g., the data messages 23, 24, and 25, are not planned in advance in the forwarding users, as would be mandatory in the related art IRT method. Only the injection instants of the real-time critical data messages, for example, data messages 23, 24, and 25, into the communication system must be planned in advance. This illustrative method also works if all the send and receive instants of the real-time critical data messages are planned in advance in all the users involved in accordance with the IRT method. As described above, however, with this illustrative method planning in advance all the send and receive instants of the real-time critical data messages is not necessary.

According to the illustrative embodiment of the present invention, a method for transmitting data messages in a switched cyclical communication system is provided. The switched cyclical communication system may, for example, be a linear or ring arrangement of the users of the respective communication system 38, 39. In this method, real-time critical data messages are transmitted in a reserved first segment 20 of a transmission cycle 31 without the need for the send and receive instants to be planned in advance in the forwarding users. The chronological start 21 of the first segment 20 of a transmission cycle 31 is guaranteed by all users in all transmission cycles through monitoring. The duration of the first segment 20 of a transmission cycle 31 can, for example, be fixedly predefined or set. Preferably, however, the first segment 20 of the transmission cycle 31 is automatically adjustable using, for example, a timeout procedure.

The above description of illustrative, non-limiting embodiments and variations thereof has been given by way of an example. The above and other features of the invention including various novel method steps and components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for transmitting data messages in a switched cyclical communication system having a plurality of users that are interconnected by network connections, in which, each user is configured as at least one of a sender and a receiver of data messages, and in which each said user has at least one buffer memory for storage of data messages, and where the data messages are transmitted in transmission cycles and each transmission cycle has at least one first segment for transmission of data messages with real-time critical data and at least one additional segment for transmission of data messages with non-real-time critical data, the method comprising:
    identifying the data messages containing real-time critical data;
    determining by a computer a chronological start of each of the at least one first segment of a respective transmission cycle within the respective transmission cycle;
    ensuring that the transmission of a non-real-time critical data message is completed when each of the at least one first segment of the respective transmission cycle starts; and
    transmitting the real-time critical data messages in the at least one first segment of the transmission cycle,
    wherein, during each cycle, based on the determined chronological start of the first segment of the respective cycle, determining if non-real-time critical data fits into the additional segment of the same respective cycle that precedes the chronological start of the first segment of the same respective cycle.

2. The method as claimed in claim 1, wherein the communication system comprises one or more sections, and wherein at least one section has no branchings and no junctions.

3. The method as claimed in claim 1, wherein the communication system comprises one or more sections, and wherein at least one section has either no branchings or no junctions.

4. The method as claimed in claim 1, wherein data messages that contain real-time critical data are identified by a unique header identifier.

5. The method as claimed in claim 1, wherein:
    prior to the chronological start of the at least one first segment of the transmission cycle, a non-real-time critical data message queued for transmission in a user is not transmitted and is buffered in the buffer memory of a user if the transmission of the data message is not completed before the chronological start of the at least one first segment of the transmission cycle and is sent only after end of the at least one first segment of the transmission cycle.

6. The method as claimed in claim 1, wherein time length of each of the at least one first segment of the transmission cycle is fixedly set.

7. The method as claimed in claim 1, wherein time length of each of the at least one first segment of the transmission cycle is automatically adjusted using a timeout procedure.

8. The method as claimed in claim 7, wherein a timeout period starts to run:
    with the chronological start of the at least one first segment of the transmission cycle, or
    after an end of a transmission of a real-time critical data message,
    wherein the at least one first segment of the transmission cycle is terminated with an elapse of the timeout period if no requests for transmission of a real-time critical data message falls within this timeout period, or
    wherein the at least one first segment is not terminated if the transmission start of a real-time critical data message falls within the timeout period.

9. The method as claimed in claim 7, wherein a duration of the timeout period is adjustable.

10. The method as claimed in claim 1, wherein:
    free memory space is reserved in the buffer memory of a user and the real-time critical data messages are buffered into the reserved free memory space of the buffer memory of the user, and
    a maximum size of the reserved free memory space matches amount of data or data messages that are to be injected at a respective user.

11. The method as claimed in claim 10, wherein, to control the reservation of the free memory space in the buffer memory of the respective user, a marking is set, and wherein the set marking corresponds to the maximum size of the free memory space that is to be reserved.

12. The method as claimed in claim 11, wherein, if less than the free memory space identified by the marking and less than the free memory space to be reserved in the buffer memory of the respective user, is available, the respective user accepts real-time critical data messages and control diagrams and performs at least one of rejecting and discarding non-real-time critical data messages.

13. The method as claimed in claim 10, wherein, if less than the free memory space identified by the marking and less than the free memory space to be reserved in the buffer memory of the respective user, is available, the respective user accepts real-time critical data messages and control diagrams and performs at least one of rejecting and discarding non-real-time critical data messages.

14. A user in a switched cyclical communication system that has at least one section that has no branchings and/or no junctions, where the user is configured as at least one of a sender and a receiver of data messages, and where the user has at least one buffer memory for storage of data messages that are transmitted in transmission cycles, each transmission cycle having at least one first segment for transmission of data messages with real-time critical data and at least one additional segment for transmission of data messages with non-real-time critical data, the user comprising:
- a module identifying the data messages containing real-time critical data;
- a module determining a chronological start of a first segment of a transmission cycle within the transmission cycle;
- a module ensuring that the transmission of a non-real-time critical data message is completed prior to the start of the first segment of the transmission cycle; and
- a module transmitting the real-time critical data messages in the first segment of the transmission cycle,
- wherein, during each cycle, based on the determined chronological start of the first segment of the respective cycle, the ensuring module determines if non-real-time critical data fits into the additional segment of the same respective cycle that precedes the chronological start of the first segment of the same respective cycle.

15. The user as claimed in claim 14, wherein the user identifies the data messages containing real-time critical data by a unique header identifier.

16. The user as claimed in claim 14, wherein, if the transmission of a non-real-time critical data message to be sent is not completed by the chronological start of the first segment of the transmission cycle,
- the user does not send the non-real-time critical data message queued for transmission prior to the chronological start of the first segment of the transmission cycle,
- the user buffers the unsent non-real-time critical data message in the buffer memory of the respective user, and
- the user sends the buffered non-real-time critical data message only after an end of the first segment of the transmission cycle.

17. The user as claimed in claim 14, wherein the user fixedly sets time length of the first segment of the transmission cycle.

18. The user as claimed in claim 14, wherein the user automatically adjusts the time length of the first segment of the transmission cycle using a timeout procedure.

19. The user as claimed in claim 18, wherein the user allows a timeout period to run with the chronological start of the first segment of the transmission cycle or after the end of the transmission of the real-time critical data message, and
- wherein the user terminates the first segment of the transmission cycle with an elapse of the timeout period if no request to start sending a real-time critical data message falls within this timeout period, or wherein the user does not terminate the first segment if the request to start sending the real-time critical data message falls within the timeout period.

20. The user as claimed in claim 19, wherein the user sets a duration of the timeout period.

21. The user as claimed in claim 18, wherein the user sets a duration of the timeout period.

22. The user as claimed in claim 14, wherein:
- the user reserves free memory space in the buffer memory of the user, the buffer memory is buffering the real-time critical data messages, and
- a maximum size of the free memory space to be reserved matches amount of data or data messages to be injected at the user.

23. The user as claimed in claim 22, wherein the user sets a marking to control the reservation of the free memory space in the buffer memory of the user, the marking corresponds to a maximum size of the free memory space to be reserved.

24. The user as claimed in claim 22, wherein, if less than the free memory space identified by the marking and to be reserved in the buffer memory is available, the user accepts at least one of real-time critical data messages and control diagrams and the user performs at least one of rejecting and discarding non-real-time critical data messages.

25. The user as claimed in claim 14, wherein the user is a network node with an integrated coupling unit.

26. The user as claimed in claim 25, wherein the integrated coupling unit is a Real-Time Ethernet switch.

27. The user as claimed in claim 14, wherein the user is an automation device.

28. A communication system having a plurality of users, each user is as claimed in claim 14.

29. The communication system as claimed in claim 28, wherein the communication system is an automation system.

30. The communication system as claimed in claim 28, wherein the communication system has a linear or a ring arrangement of users.

31. A switched cyclical communication system for transmitting data, comprising:
- a plurality of users, each user having at least one buffer memory and each user being configured as at least one of a sender and a receiver of data; and
- a plurality of network connections interconnecting the plurality of users,
- wherein the communication system transmits data from one user to another user in transmission cycles, each transmission cycle comprises a first type segment transmitting only real-time critical data and at least one second type segment transmitting only non-real-time critical data,
- wherein the first type segment comprises a timeout period before and after sending a unit of the real-time critical data, and
- wherein, if an additional unit of the real-time critical data designated for transmission is received during the timeout period by a respective user, duration of the first type segment is extended.

32. The switched cyclical communication system as claimed in claim 31, wherein, if the additional unit of the real-time critical data designated for transmission is received during the timeout period by the respective user, the duration of the first type segment is extended by a transmission time of the received additional unit of the real-time critical data and an additional timeout period, and wherein the timeout period is of a preset duration.

33. The method as claimed in claim 1, wherein each of the cycles begins with the at least one additional segment for transmission of data messages with non-real-time critical data and wherein the first segment is started in a middle of the cycle as indicated by the chronological start.

34. The method as claimed in claim 1, wherein the transmission of the data messages with real-time critical data in the respective transmission cycle is not planned in advance of the respective transmission cycle.

35. The method as claimed in claim 33, wherein each of the cycles is isochronous cycle.

36. The method as claimed in claim 1, wherein the chronological start identifies start of each of the at least one first segment within a respective isochronous transmission cycle.

* * * * *